Feb. 6, 1968  A. FEYERHERD  3,367,603
PNEUMATIC DISPATCH SYSTEM
Filed July 11, 1966  5 Sheets-Sheet 1

Feb. 6, 1968         A. FEYERHERD                3,367,603
                  PNEUMATIC DISPATCH SYSTEM
Filed July 11, 1966                           5 Sheets-Sheet 3

United States Patent Office 3,367,603
Patented Feb. 6, 1968

3,367,603
PNEUMATIC DISPATCH SYSTEM
Alexander Feyerherd, Bad Honnef, Germany, assignor to Rotterdamse Telecommunicatiemaatschappij N.V., Rotterdam, Netherlands
Filed July 11, 1966, Ser. No. 564,435
Claims priority, application Germany, July 10, 1965, F 46,575
6 Claims. (Cl. 243—29)

ABSTRACT OF THE DISCLOSURE

A pneumatic dispatch system in which the ends of two pneumatic tubes are adapted for being selectively coupled to a trunk pipe line by a switch tube pivotably connected at one end to the trunk pipe line with axial freedom and elastically urged against said line, the switch tube being subjected to the action of a pivotal carrier driven through a limited angle for moving the switch tube between the pneumatic tubes, the carrier having a slot receiving a pin on the switch tube to displace the pin and thereby the switch tube axially away from the pneumatic tubes when the switch tube is moved from one pneumatic tube to the other.

---

My invention relates to pneumatic dispatch systems with air tight switches and in particular to such systems in which the switch consists of a swingable tube which on the one hand is connected via a joint to a guide tube track and on the other hand has an end with a seal which can be arbitrarily aligned with the ends of two guide tubes. Such switches are known. The problem of their actuation, however, has not yet been satisfactorily solved. A magnetic actuation, which at present is customary, has many disadvantages. This is the case since it is necessary to swing the free end of the switch tube for at least its full diameter, and on account of the fact that over this distance the strength of the magnetic field decreases considerably, it is necessary to employ very great magnetic strengths even with small tube diameters, while switch tubes with larger diameters cannot be economically operated in this way.

Another disadvantage is that the swing forces continuously decrease on approaching the final position, so that great shock loads are produced which are not only applied to the switch tube but also to the complete installation which give rise to disturbing noise.

Apart from the fact that great forces are required owing to the sealing faces scraping over one another there is also a great wear and tear and consequently much upkeep and a reduced reliability of service.

It has already been suggested to use additional magnets in order to achieve a minor axial movement of the switch tube. Due thereto the wear and tear of the sealing faces can be reduced but a considerably greater energy is required since the attractive forces of the magnets counteract the effect of the turning magnets. In this embodiment the poles of at least a part of the magnets should be reversed whereby the quantity of energy required for magnetization is considerably increased, since with each reversal of the poles for the creation of the desired magnetic field the existing permanent magnetic field must first be destroyed.

Mechanical drives have not been put into use as they are mostly complicated and their construction lacks efficiency.

It is an object of the invention to provide a very simple and efficient air tight switch tube with a mechanical drive. According to the invention a carrier member for a single switch tube is employed for that purpose, the said carrier member being capable of rotation about a fixed axle through an arc having a radius substantially smaller than the swing radius of the switch tube, the carrier member being connected to the switch tube to urge the switch tube in an axial direction away from the joint formed with the guide tubes against the action of a spring urging the switch tube in the direction of the exit tube.

In this way the desired course of movement is obtained at the joint of the switch tube and the guide tubes, namely first an axial movement in a direction away from the guide tubes, thereafter a turning movement at increased speed which at the end is automatically slowed down, and finally an almost purely axial movement for pressing the switch tube packing against the exit tube.

This can be clarified briefly as follows: each semicircular movement proceeds at its end in a reversed direction as compared with that at the beginning, a transverse movement being made in the central part. If this movement is combined with a movement ranging a curve in opposition thereto this results in a movement curve which resembles a compound curve and consequently is an approximation of the desired curve of movement.

In fact no curvature guides and reversals of movement are required. According to the basic principle of the invention the swing drive for the switch tube can in a simple way be constructed in such manner that a swinging lever driven by a motor is directly coupled to the switch tube.

For practical reasons it is, however, advisable to interpose a free travel between the switch member and its driving member. Even if it is assumed that the driving motor can be switched off with great exactness it cannot be denied that the factors determining the extent of afterrun of the motor, like the consistency of the lubricant or other frictional resistances, often change.

On the other hand in practice often an angular movement much smaller than 180° suffices, since the exactness of the axial movement of the swinging tube is immaterial and too great axial movements in the joint would complicate the construction thereof.

Consequently in a preferred embodiment two slots are provided in the switch member which are at an angle—preferably at right angles, with each other, a swinging lever, driven by a motor and provided with a carrier cam e.g. a roller, being capable of engaging one slot, and a cam secured to the switch tube and serving as a point of application engaging the other slot, it being advisable for reasons which will be disclosed hereinafter that the slot of the switch member and, if need be, the slot for the carrier pin, too, are open at one end.

At any rate it is advisable that a guide, or locking roller, is disposed on the switch tube and a guide or locking slot is provided on each of the exits. It is further possible to provide end switches which can be actuated by an operating pin on the switch tube and which permit switching the motor off and/or short-circuiting its armature winding.

An especially efficient joint structure, which in connection with the basic idea of the invention is very advantageous and which enables the switch tube to follow the course of movement determined by the special character of the drive and which allows to eliminate all frequently occurring disturbances, is finally realized in the way that for the formation of the axially yielding joint two oppositely situated lips are provided on the fixed tube part which in conformity with the circumference of the tube may be curved, the switch tube having corresponding recesses of a shape and depth such that the switch tube in respect of the fixed tube part can both perform a limited axial movement and a swinging movement, while further at diametrical locations on this fixed tube part and staggered through 45°, 60° or 90° in respect of the lips there are provided lip shaped plate springs, while at the corresponding locations of the swinging tube matching recesses are provided according as two, four or six resilient lips besides the guide lips are applied at different tube diameters.

The invention is described in further detail with reference to the accompanying drawing. In the drawing.

Figure 1:
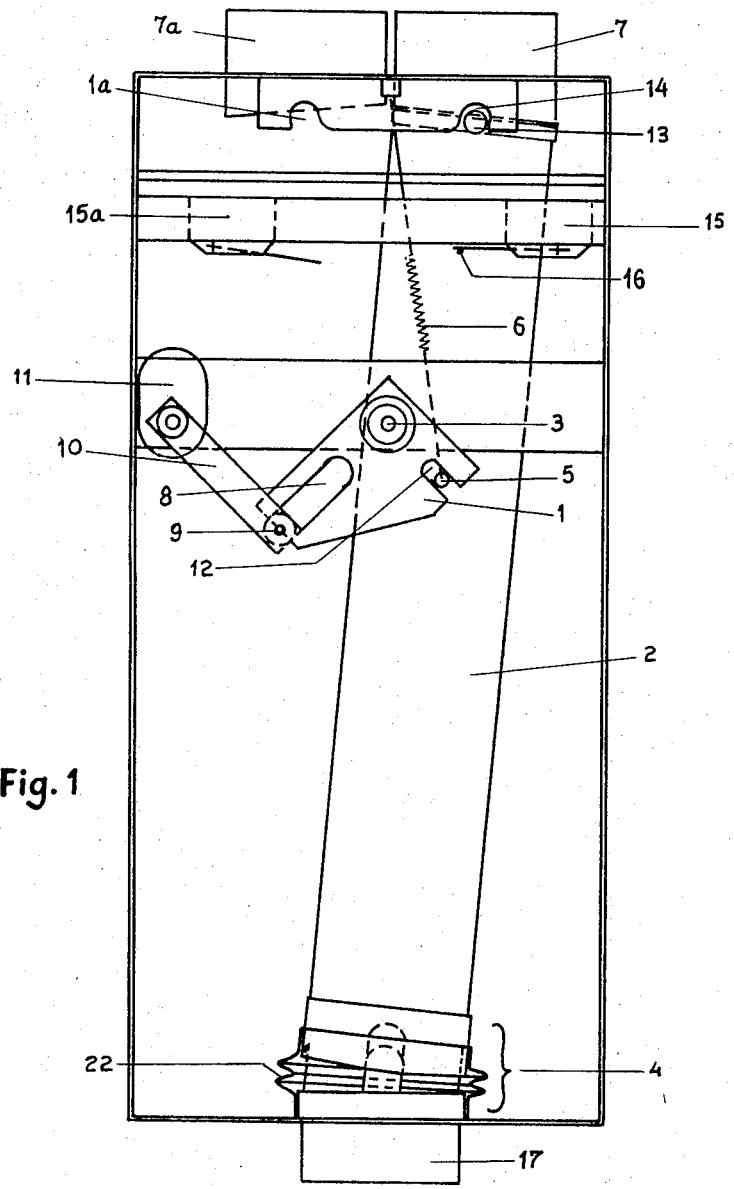
FIGURES 1–3 are diagrammatic side elevation views of the devices according to the invention in which various stages of movement are shown.
Figure 2:
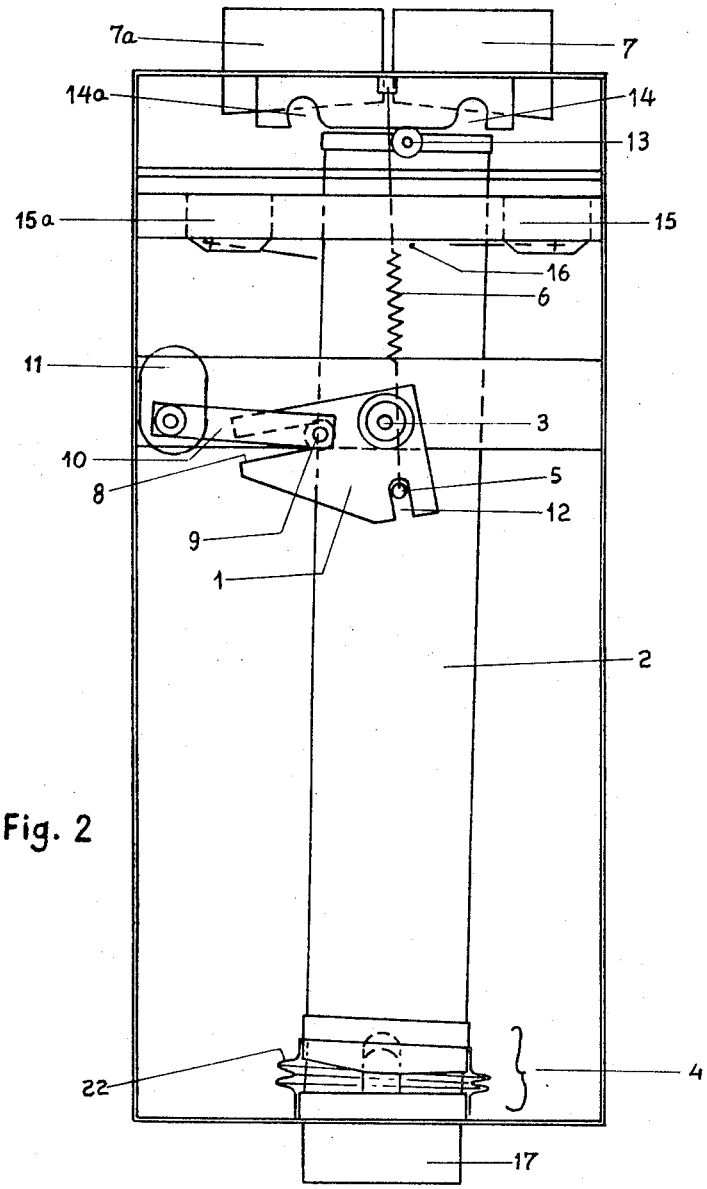
Figure 3:
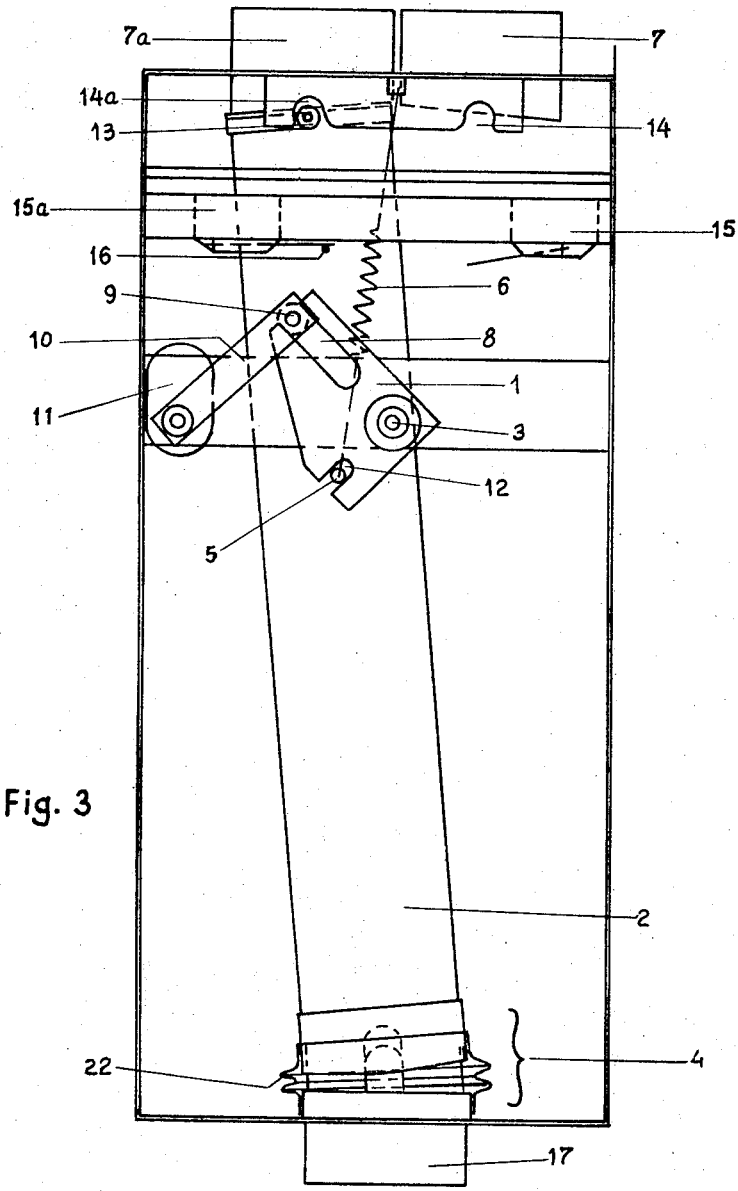
Figure 4:
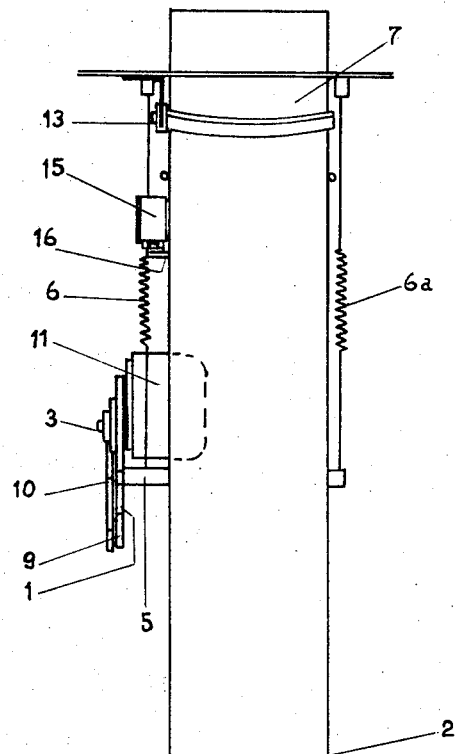
FIGURE 4 is a side elevation view of the device in FIGS. 1–3 turned through 90°.
Figure 4:
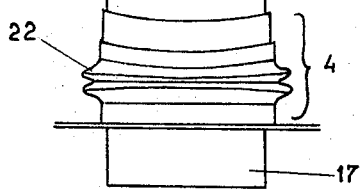

According to FIGS. 1 to 4, an oblong swinging tube 2 is pivotably connected via a joint 4 with a fixed carrier tube 17 in order to communicate selectively with exit tubes 7, 7a, with an air tight connection. For that purpose a switch or carrier member 1 is provided which is swingable about an axle 3 in the frame, the said member producing movement of a carrier pin 5 secured to the swinging tube 2. Springs 6 and 6a serve to ensure an air tight connection between tube 2 and one of the exit tubes 7 or 7a in the final positions of the switch tube 2. The sealing faces proper are not specially denoted. In order to transmit the motion from the motor 11 to the switch member 1, a lever 10 is provided which with its carrier roller 9 can engage a notch 8 of the switch member 1 and consequently, when the lever 10 is swung, move the switch piece from the one final position into the other final position, as is illustrated in FIGS. 1 and 3.

A second slot 12 is provided in order to receive the pin 5 and to transport pin 5 therein to constitute a coupling which connects the switch member 1 with the swinging tube 2 and yields to an extent.

At the end of the swinging tube 2 in the vicinity of the exit tubes is a guide roller 13 which in the final positions can either engage a corresponding guide notch 14 on the exit tube 7 or a corresponding notch 14a on the exit tube 7a. Furthermore micro switches 15 and 15a are provided as end switches, which are activated by a pin 16 on the swinging tube 2 at the end of the path of movement and which deenergize or brake the motor 11.

The operation is as follows. In order to swing the switch tube 2, the motor 11 is excited by means of a selector device in the emitter station. On the output shaft of motor 11 the swing lever 10 is fixedly mounted. The roller 9 enters the notch 8 of the switch piece 1 and moves the latter from the position in FIG. 1 into that according to FIG. 3 or vice versa. In this way an approximately U-shaped curve of movement of the carrier pin 5 is produced. In the last part of the movement, which is substantially axial in which the roller 13 enters one of the guide grooves 14, 14a, respectively, the pin 16 contacts the switch strip of one of the micro switches 15 or 15a and switches the motor off and short circuits, if need be, the armature winding thereof in order to keep the afterrun of the motor within narrow bounds.

For that purpose the motor may conveniently be constructed as a direct current motor with a permanent magnetic field excitation since in such a motor the direction of rotation can be changed by reversing the polarity and furthermore it can be short circuited so as to be braked.

If now the slot 8, as represented, is open at one end the roller 9, can leave the slot in the event there is a certain afterrun of the motor. The switch members remains in its defined position since the swinging tube 2 is locked at the exit and retained at that position by the carrier pin 5. When the driving motor 11 is again switched on, the roller 9 enters the notch 8 without difficulty and swings the switch member, and in the new position the roller 9 can leave the notch 8 without difficulty, although this is not necessary. This kind of free travel has appeared to be very efficient, since no braking or abutment forces are transmitted to the frame on account of its function.

Even when the swinging tube contacts the exit under the action of the springs 6 and 6a this is not effected all at once but in a way controlled by the movement of the switch member 1. As a result the desired kind of movement is more or less automatically obtained, namely, at first the swinging tube is lifted slowly from the exit tube, while subsequently the swing is gradually accelerated and then decelerated, after which the tube is placed on the other exit tube. In addition thereto, the noise of the switch over is extraordinarily small. Shocks in the driving gear are entirely avoided. The motor can start without load and after being switched off it can run out freely. The required controlling power remains small and the charging rate is almost constant in operation. A controlling power is only required during the switch operation which in practice lasts only about 400 microseconds.

The bias of the springs 6 and 6a need not be changed since it is not essential. It should only support to an extent the automatic movement of the swinging tube into the sealing position and ensure the tightness in the final position.

Figure 5:
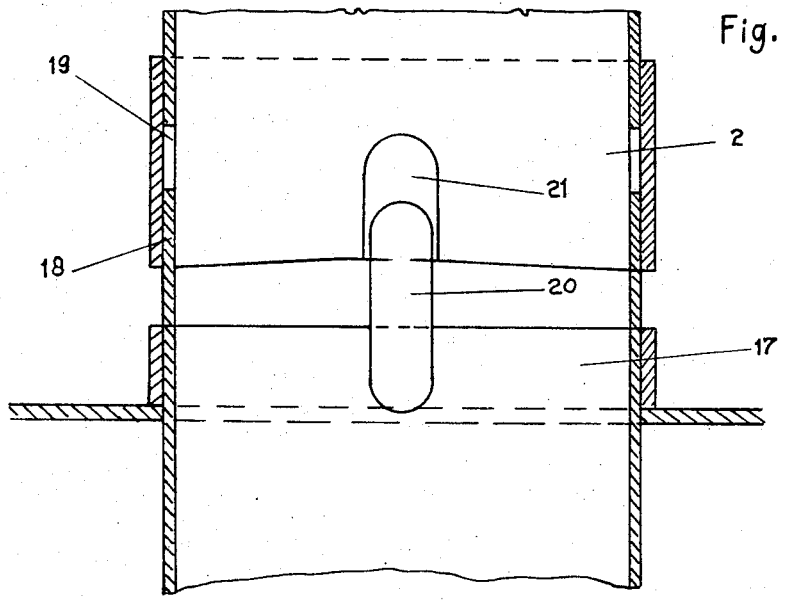
FIGURES 5 and 5a show on enlarged scale details of the device.
Figure 5A:
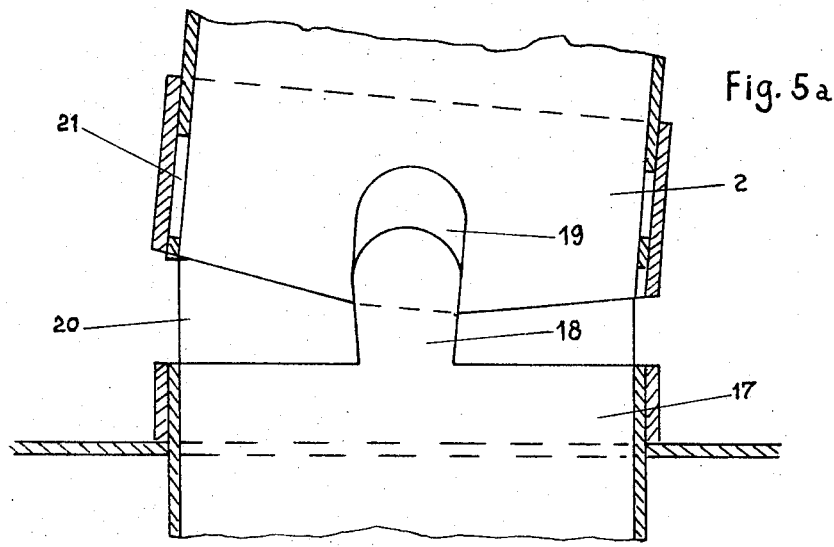

Another advantage is in that the swinging tube 2 cannot be moved out of its position by a container passing at a high speed. In order to eliminate obstacles in the joint and to be able to utilize fully the reliability of the switch at the high speeds at which the containers travel through the system, this joint is constructed in a special way as shown in FIGS. 5 and 5a. At the tube end 17 are provided guide lips 18 and in the switch tube 2 corresponding recesses 19 are provided of such shape and depth that the swinging tube according to FIG. 5 can perform a swinging movement perpendicular to the plane of the drawing and as seen in FIG. 5a, in the drawing plane and parallel thereto, respectively, while also being capable of undergoing longitudinal movement relative to tube end 17. The lips 18 are curved in conformity with the circumference of the tube end 17, and the swinging tube 2, respectively. Staggered at right angles therewith are resilient lips 20 on the tube end 17, the said lips engaging recesses 21 in the swinging tube. In this case attention has also been given to the fact that the axial movement should not be hampered and that moreover the swinging movement can be effected without changing the inner diameter. In this way a shock free guiding of the container in the pneumatic system is obtained which not only allows higher speeds but moreover achieves this at a reduced effort of the blower.

A special advantage of the switch according to the invention is that not only can pneumatic tube systems with nominal widths of 60 mm. be operated at a minimum consumption of energy, but also such systems having nominal widths of 90 mm., 110 mm. and so on without an essential increase of the controlling power.

Having thus described the invention and manner of its operation what I claim as my invention is:

What I claim is:

1. In a pneumatic dispatch system in which the ends of two pneumatic tubes are to be selectively coupled to a trunk pipe line, an improvement comprising a switch tube having opposite ends, means connecting the switch tube at one of the ends thereof to the trunk pipe line for pivotal movement and for limited axial movement, a seal on the other of said ends of the switch tube for being selectively engaged with the pneumatic tubes, resilient means acting on the switch tube for urging the switch tube towards the pneumatic tubes, actuating means acting on the switch tube to move the same angularly between first and second positions in which the switch tube is engaged with a respective pneumatic tube, said actuating means including a carrier pivotably connected to the switch tube and driven through a limited angle around an axis which lies between the trunk pipe line and the pneumatic tube and which extends perpendicular to the plane of movement of the switch tube, said carrier member being provided with a slot lying between the pivot axis of the carrier and the axis of pivotable movement of the switch tube about the trunk pipe line, and a fixed pin on the switch tube slidably engaged in said slot, said slot being oriented in the carrier such that as the carrier undergoes pivotal movement to move the switch tube between said first and second positions, the carrier at the bottom of the slot initially acts on the pin to urge the switch tube axially towards the trunk pipe line and away from the engaged pneumatic tube against the action of the resilient means whereby the seal is displaced from the pneumatic tubes whereafter when the switch tube reaches the other of said positions the pin is free to be displaced in said slot and thereby the switch tube is urged axially by the resilient means into engagement with the associated pneumatic tube.

2. An improvement as claimed in claim 1 wherein said carrier is provided with a second slot extending at right angles to the first slot, the actuating means further comprising an angularly driven lever, and means on said lever slidably engaged in the second slot of the carrier for driving the same.

3. An improvement as claimed in claim 2 wherein said means engaged in the second slot is a roller, the actuating means further comprising a motor coupled to the lever to drive the same and thereby the carrier.

4. An improvement as claimed in claim 1 comprising means for the locking engagement of the pneumatic tubes and the switch tube when the latter is in said first and second positions, the latter said means including a second pin on one of the engaged tubes and a fixed slot on the other of the engaged tubes, said second pin being engaged in the fixed slot to lock the tubes against angular displacement when the switch tube is in said positions.

5. An improvement as claimed in claim 1 wherein said actuating means further comprising a motor for driving the carrier member, switch means for controlling operation of the motor, said switch tube including an operating pin which contacts said switch means when the switch tube reaches said first and second positions and interrupts operation of the motor.

6. An improvement as claimed in claim 1 wherein said means connecting the switch tube and the trunk pipe line comprises two fixed elements on the trunk pipe line, said switch tube having recesses in which the fixed elements on the trunk pipe line are slidably received to provide the relative axial movement between the switch tube and the trunk pipe line.

References Cited

UNITED STATES PATENTS

| | | | |
|---|---|---|---|
| 1,053,969 | 2/1913 | Branington | 74—96 |
| 1,582,504 | 4/1926 | Bird | 74—96 |
| 2,237,530 | 4/1941 | Olley | 74—96 |
| 2,618,713 | 11/1952 | Blinn | 74—96 |

FOREIGN PATENTS

| | | |
|---|---|---|
| 1,014,209 | 9/1964 | Great Britain. |
| 48,632 | 11/1964 | Poland. |

RICHARD E. AEGERTER, *Primary Examiner.*

EVON C. BLUNK, HARVEY C. HORNSBY,
*Examiners.*